(No Model.)

T. J. HALE.
BOX FOR VEHICLE AXLES.

No. 578,235. Patented Mar. 2, 1897.

Witnesses
Wm. F. Doyle.
J. A. Hilson.

Inventor
Thomas J. Hale.
By H. B. Willson.
Attorney

UNITED STATES PATENT OFFICE.

THOMAS J. HALE, OF CLAIBORNE, OHIO.

BOX FOR VEHICLE-AXLES.

SPECIFICATION forming part of Letters Patent No. 578,235, dated March 2, 1897.

Application filed September 2, 1896. Serial No. 604,647. (No model.)

*To all whom it may concern:*

Be it known that I, THOMAS J. HALE, a citizen of the United States, residing at Claiborne, in the county of Union and State of Ohio, have invented certain new and useful Improvements in Boxes for Vehicle-Axles; and I do declare the following to be a full, clear, and exact description of the invention, such as will enable others skilled in the art to which it appertains to make and use the same.

My invention has relation to improvements in boxes for vehicle-axles, and the object is to provide an axle-box with bearings at the ends thereof, and an intervening space to be filled with oil to reduce the friction and render the box or axle self-lubricating.

To these ends the novelty consists in the construction, combination, and arrangement of the same, as will be hereinafter more fully described, and particularly pointed out in the claim.

Figure 1:
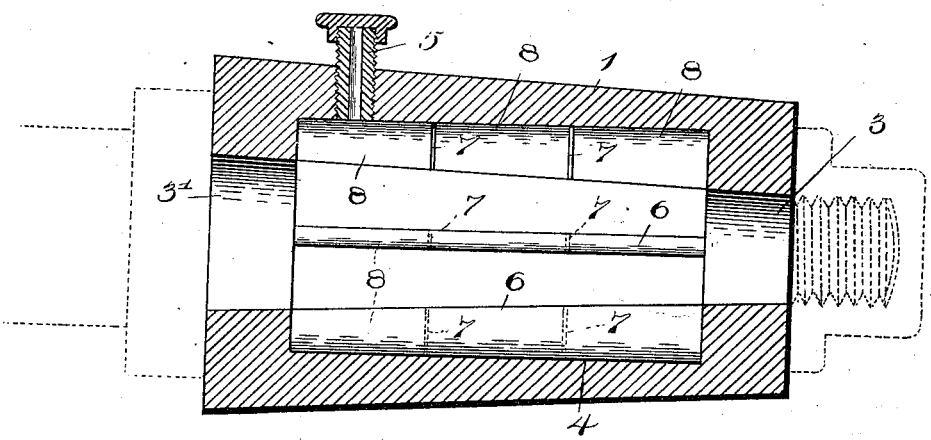
Figure 2:
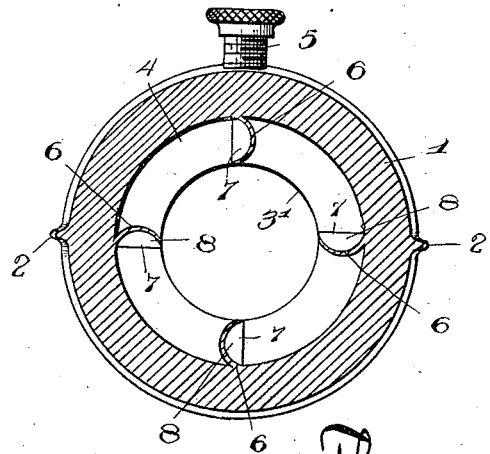

Figure 1 is a longitudinal section of my improved axle-box, and Fig. 2 is a transverse section of the same.

The same figures of reference indicate the same parts of the invention.

1 represents the tapering shell, provided on its outside with fins 2 2, by means of which it is secured in the hub.

3 3' represent the bearings, which are tapering to correspond to the shape of the axle, and between these bearings 3 3' is a recess 4, which forms an oil-chamber which is filled through the screw-cap 5, and 6 6 represent integral curved wings extending longitudinally between the bearings 3 3'.

7 7 represent partitions at intervals in the wings, which form pockets 8 8, and as the hub revolves, the pockets in the wings pick up the oil and automatically and evenly supply it to the axle-bearings 3 3' as long as the vehicle is in motion.

Having thus fully described my invention, what I claim as new and useful, and desire to secure by Letters Patent of the United States, is—

An axle-box formed with an enlarged interior chamber and axle-bearings, curved wings arranged in an annular series around said chamber and extending the full length thereof, and partitions arranged in said wings to prevent the oil gravitating to one end when the box is canted to one side, substantially as shown and described.

In testimony whereof I hereunto affix my signature in presence of two witnesses.

THOMAS J. HALE.

Witnesses:
GEORGE SMITH,
R. G. COOK.